United States Patent [19]

Kienast et al.

[11] Patent Number: 4,486,460
[45] Date of Patent: Dec. 4, 1984

[54] COMPOSITION FOR LIVE FISHBAIT COATING

[76] Inventors: Dallas R. Kienast; Patricia L. Kienast, both of 4458 Omro Rd., Oshkosh, Wis. 54901

[21] Appl. No.: 516,734

[22] Filed: Jul. 25, 1983

[51] Int. Cl.$^3$ .......................... A01G 5/06; A23L 1/34
[52] U.S. Cl. ............................................. 427/4; 426/1
[58] Field of Search ................................. 427/4; 426/1

[56] References Cited

U.S. PATENT DOCUMENTS

| | | | |
|---|---|---|---|
| 2,827,376 | 3/1958 | Breuer | 426/1 |
| 3,322,544 | 5/1967 | Yakstis | 426/1 |
| 3,545,404 | 12/1970 | Loftus | 426/1 |
| 3,666,669 | 5/1972 | Noordam | 426/1 |
| 4,143,161 | 3/1979 | Ciulla | 426/1 |

*Primary Examiner*—John E. Kittle
*Assistant Examiner*—James J. Seidleck
*Attorney, Agent, or Firm*—Harvey B. Jacobson

[57] ABSTRACT

A coating for live fishbait, such as minnows, worms and the like which includes cornmeal, a specific color ingredient and scent ingredient to more effectively attract fish to the bait. The coating composition is such that it will not easily wash off of the live fishbait and will remain on the live fishbait for an extended period of time after the live fishbait has been placed in water during normal fishing procedures. The coating composition is in powder form with the individual ingredients being thoroughly mixed and the live fishbait is provided with the coating by merely laying the live fishbait on the powder coating material and rolling or otherwise turning the live fishbait so that the external surface thereof is thoroughly coated with the coating composition. The coating composition consists of ground cornmeal, a coloring agent and anise oil in which the cornmeal is ground to a very fine consistency and the coloring agent is a commercially available radiant fluorescent pigment and the ingredients of the composition are mixed in a precise ratio so that it will effectively attract fish and remain on the live fishbait for an extended period of time.

6 Claims, No Drawings

COMPOSITION FOR LIVE FISHBAIT COATING

BACKGROUND OF THE INVENTION

1. Field of the Invention

The present invention generally relates to a composition for coating live fishbait which is in powder form and can be easily packaged and distributed in conventional packaging with the live fishbait, such as minnows, worms, insects and the like, so that the live fishbait may be easily coated by a person engaged in various fishing procedures in a quick and efficient manner with the coating remaining on the fish bait for long periods of time even when immersed in water and providing a coating which forms an attractant to the fish thereby rendering the fishing procedures more efficient in catching fish.

2. Description of the Prior Art

Various techniques and procedures have been provided to enable more efficient fishing procedures to be practiced. Such devices include various types of artificial lures as well as various types of live fishbait which are carefully selected by the individual engaged in fishing taking into consideration various factors such as the type of fish to be sought, the water being fished and other physical factors. The following U.S. patents disclose various techniques and procedures for the purpose of more effectively fishing:

| | |
| --- | --- |
| 742,293 | Oct. 2, 1903 |
| 2,849,981 | Sept. 2, 1958 |
| 3,403,466 | Oct. 1, 1968 |
| 3,545,404 | Dec. 8, 1970 |
| 4,143,161 | Mar. 6, 1979 |
| 4,202,905 | May 13, 1980 |

SUMMARY OF THE INVENTION

The present invention generally relates to a composition for coating live fishbait without causing injury to or death of the live fishbait and at the same time providing an attractant to fish being sought with the coating being such that it will remain on the exterior of the live fishbait for an extended period of time even when immersed in water.

Another object of the invention is to provide a life fishbait coating which is in powder form which can be easily packaged and distributed and easily applied to the external surface of various types of live fishbait such as minnows, worms, insects and the like.

A further object of the invention is to provide a live fishbait coating in which the composition includes finely ground cornmeal, a coloring agent in the form of radiant fluorescent pigments and anise oil thoroughly mixed together with only a small quantity of anise oil being used to provide a scent attractant while at the same time permitting the mixture to remain in powder form.

Still another object of the invention is to provide a live fishbait coating composition consisting of 3 lbs. of finely ground cornmeal, 1 lb. of coloring agent and ⅛ oz. of anise oil.

A still further object of the present invention is to provide a live fishbait coating composition which is effective in attracting fish, relative inexpensive to manufacture, package and distribute, safe in use in that it does not harm the live fishbait nor does it introduce any toxic materials into the water into which the fishbait is immersed and simple and efficient in use.

Further objects and advantages of the invention will become more readily apparent from the following detailed disclosure of the invention.

DESCRIPTION OF THE PREFERRED EMBODIMENT

The coating composition for live fishbait of the present invention is in the form of a powder having a predetermined quantity of finely ground cornmeal, coloring agent and anise oil with the ingredients being combined, folded over or otherwise thoroughly mixed into a homogeneous powder which can be easily handled, packaged, distributed and used with the live fishbait being coated on the exterior with the coating composition which does not in any way harm the live fishbait thus leaving the live fishbait in live form with the coating having the capability of remaining on the live fishbait for extended periods of time even when the live fishbait is immersed in water. Also, the coating composition does not introduce any toxic substances into the water in which it is submerged during a fishing procedure.

The ground cornmeal is in the form of a commercially available cornmeal in which corn, which may be white, yellow or other color, is finely ground to a consistency in which the particles are larger than flour and generally are of the same size as commercially available ground cornmeal. Anise oil is a colorless or pale yellow, strongly refractive liquid having the characteristic odor and taste of anise and is commercially available from commercial establishments that normally supply pharmaceutical products.

The coloring agent used is a radiant fluorescent pigment in the form of a dyed polymer distributed commercially by Radiant Color Company of Richmond, Calif., which is not toxic to animals determined by tests conducted to determine oral toxicity in accordance with the method specified in Section 191.1 of the Regulations under the Federal Hazardous Substance Labelling Labelling Act of 1960. It has been found that fluorescent orange and chartreuse radiant fluorescent pigments when mixed with the other ingredients of this composition remain on the external surface of the live fishbait for a longer period of time when immersed in water. However, other colors can be used including green, red, cerise, pink, orange-yellow and orange-red.z In formulating the composition, the ingredients are thoroughly mixed in any suitable manner in the ratio of 3 lbs. of finely ground cornmeal, 1 lb. of radiant fluorescent pigment and ⅛ oz. anise oil. Thus, the cornmeal and pigment coloring agent are present generally in a 3:1 ratio with only a very small quantity of anise oil being present to provide a scent attractant while the ground cornmeal also produces some degree of scent attractant and the coloring agent produces a color attractant. This composition coats the outside of the live fishbait without causing death or injury to the live fishbait and without introducing any toxic substances into the water being fished. It has been found that ground cornmeal works effectively while other grains such as oats, wheat flour and the like did not work and ratios other than 3:1 of the ground cornmeal and pigments wash off the live fishbait almost immediately after immersion in the water, whereas the ground cornmeal and orange or chartreuse coloring agent when mixed in the 3:1 ratio would remain on the live fishbait for approximately 8 hours. Accordingly, it is critical that the finely ground cornmeal and radiant fluorescent pigments be combined in the 3:1 ratio with a small quantity of anise oil being added to produce a scent attractant. Otherwise, the coating will not stay on the live fishbait and thus will not be effective. By using the live fishbait coating of the present invention, the fishbait will not be adversely affected and will remain alive insofar as the coating composition is concerned. The coating is applied by merely placing the live fishbait on a thin layer of powdered composition and rolling or turning the live fishbait in a manner to cover the entire external surface thereof. Various types of live fishbait may be coated with this composition including live minnows, live worms, live insects and the like. Also, the coating composition will not introduce any toxic substances into the water being fished and therefore it is completely safe in operation. Further, it has been found that live fishbait with the coating composition of the present invention applied thereto more effectively and efficiently attracts fish thereto thereby rendering the fishing procedure more efficient.

The foregoing is considered as illustrative only of the principles of the invention. Further, since numerous modifications and changes will readily occur to those skilled in the art, it is not desired to limit the invention to the exact composition and operation described, and accordingly, all suitable modifications and equivalents may be resorted to, falling within the scope of the invention.

What is claimed as new is as follows:

1. A coating for the external surface of live fishbait consisting of ground cornmeal and a coloring agent in powdered form whereby live fishbait may be coated externally with the composition without adversely affecting the life span or normal movement of the live fishbait.

2. The coating as defined in claim 1 together with anise oil incorporated into the composition to produce a scent attractant.

3. The coating as defined in claim 2 wherein said coloring agent is a radiant fluorescent pigment in the form of a dyed polymer whereby none of the ingredients of the coating are toxic to the live fishbait nor will the coating introduce toxic substances into the water when immersed therein during fishing procedures.

4. The coating as defined in claim 3 consisting of 3 lbs. of finely ground cornmeal, 1 lb. of radiant fluorescent pigment selected from or a combination of one or more pigments selected from the group including orange, chartreuse, green, red, cerise, pink, orange-yellow and orange-red and ⅛ oz. anise oil.

5. A bait for fishing comprising a living creature normally used in its normal live state as fishbait, and a non-toxic coating applied only to the external surface of the living creature so as to not change normal movement of the creature nor to shorten the normal life span of the creature when used as fishbait, said coating consisting of a mixture of finely ground cornmeal, fluorescent pigment and anise oil.

6. The bait as defined in claim 5 wherein said coating consists of approximately 3 lbs. of cornmeal, 1 lb. of fluorescent pigment and ⅛ oz. of anise oil, said pigment being one or a combination of one or more pigments selected from a group including orange, chartreuse, green, red, cerise, pink, orange-yellow and orange-red, said living creature being selected from the group including minnows, worms and insects with the coating being in powder form and forming a thin layer on the living creature for adherence thereto over a long period of time without introducing toxic material into the water being fished.

* * * * *